United States Patent
Gorelik et al.

(10) Patent No.: US 11,956,231 B1
(45) Date of Patent: Apr. 9, 2024

(54) AUTHORITY TRANSFER FOR VIRTUAL OBJECTS IN SHARED COMPUTER-GENERATED REALITY ENVIRONMENTS

(71) Applicant: Apple Inc., Cupertino, CA (US)

(72) Inventors: Igor L. Gorelik, San Jose, CA (US); Courtland M. Idstrom, San Mateo, CA (US); Pablo P. Cheng, Chino Hills, CA (US); Yasser Rihan, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 571 days.

(21) Appl. No.: 16/880,357

(22) Filed: May 21, 2020

Related U.S. Application Data

(60) Provisional application No. 62/854,349, filed on May 30, 2019.

(51) Int. Cl.
| | |
|---|---|
| *H04L 9/40* | (2022.01) |
| *G06T 7/73* | (2017.01) |
| *G06T 19/00* | (2011.01) |

(52) U.S. Cl.
CPC ............ *H04L 63/0869* (2013.01); *G06T 7/73* (2017.01); *G06T 19/00* (2013.01); *H04L 63/123* (2013.01); *G06T 2219/024* (2013.01)

(58) Field of Classification Search
CPC ..... H04L 63/0869; H04L 63/123; G06T 7/73; G06T 19/00; G06T 2219/024
See application file for complete search history.

(56) References Cited

U.S. PATENT DOCUMENTS

| | | | |
|---|---|---|---|
| 10,911,535 B1* | 2/2021 | Cheng ................. | H04L 67/1097 |
| 2008/0282090 A1* | 11/2008 | Leybovich ........... | H04L 9/3247 |
| | | | 713/182 |
| 2011/0289152 A1* | 11/2011 | Van Datta ............ | A63F 13/358 |
| | | | 709/205 |
| 2017/0041658 A1* | 2/2017 | Mattingly ................. | H04L 9/40 |
| 2019/0311341 A1* | 10/2019 | Rice ........................ | G06F 3/011 |
| 2020/0403808 A1* | 12/2020 | Smith .................... | H04L 9/3213 |
| 2021/0136123 A1* | 5/2021 | Maher ..................... | H04W 4/70 |

* cited by examiner

*Primary Examiner* — Sing-Wai Wu
*Assistant Examiner* — Khoa Vu
(74) *Attorney, Agent, or Firm* — Thompson Hine LLP

(57) ABSTRACT

Various implementations disclosed herein include devices, systems, and methods that provide authority transfer of a virtual object in a shared CGR environment. In some implementations, at a first electronic device associated with a first owner having authority to transmit state updates of a virtual object, a state update is transmitted to one or more peers participating in the shared CGR environment associated with the current state of the virtual object by the first electronic device. In some implementations, a handoff message is transmitted to indicate that ownership of the virtual object is being handed off. Then, an acquisition message transmitted by a second electronic device associated with a second owner indicates ownership acquisition of the virtual object by the second owner. The first electronic device accepts state updates of the virtual object transmitted from the second owner based on receiving the acquisition message.

19 Claims, 9 Drawing Sheets

AUTHORITY TRANSFER FOR VIRTUAL OBJECTS IN SHARED COMPUTER-GENERATED REALITY ENVIRONMENTS

CROSS-REFERENCE TO RELATED APPLICATIONS

This application claims the benefit of U.S. Provisional Application Ser. No. 62/854,349 filed May 30, 2019, which is incorporated herein in its entirety.

TECHNICAL FIELD

The present disclosure generally relates to electronic devices such as head mounted display (HMDs) that provide a shared computer-generated reality (CGR) environment, and in particular, to systems, methods, and devices providing authority transfer of a virtual object in a shared CGR environment.

BACKGROUND

A shared CGR environment provides local CGR environment replication between multiple networked peers where each networked peer (e.g., node in a networked session) is capable of creating and modifying a certain subset of virtual objects in the CGR environment. Each networked peer transmits state updates (e.g., pose, motion, simulated physics, etc.) to other peers for its respective subset of virtual objects to synchronize the shared CGR environment. However, local CGR environment versions at each networked peer can diverge when ownership of virtual objects in the shared CGR environment is transferred among the networked peers.

SUMMARY

Various implementations disclosed herein include devices, systems, and methods for providing authority transfer of a virtual object in a shared CGR environment. In some implementations, the networked peer that owns the virtual object transfers ownership (e.g., hands off authority over) using a two phase process. In some implementations, in the first phase, the peer owning the virtual object notifies other networked peers (e.g., all peers in the CGR environment that can "see" or are aware of the virtual object) that ownership is being transferred to a destination peer. In such a first phase, remaining networked peers need not change any local object ownership, but may record that the ownership transfer will occur between the identified peers for the identified virtual object.

In some implementations in the first phase, the network peer owning the virtual object can continue to transmit state updates for the virtual object that can be accepted by the remaining networked peers. For example, such updates from the transferring owner (e.g., in the first phase) until the actual transfer occurs can improve the real-time shared CGR environment in circumstances in which changes continue to occur, e.g., a virtual object is falling during the transfer.

In some implementations, in a second phase the destination networked peer takes control or ownership of the virtual object and starts transmitting (e.g., broadcasting) state updates for the virtual object to the remaining networked peers. In some implementations, the state updates from the owner destination peer implicitly identify that authority has been transfer has occurred and are thus used upon receipt by the remaining networked peers. No special message separate from the state updates need be transmitted by the destination peer.

Alternatively, in some implementations, a separate handoff message that identifies the destination peer is transmitted by the peer currently owning the virtual object to all other peers. In this example, a separate acquisition message is transmitted by the destination peer upon ownership of the virtual object to other networked peers in the CGR environment.

Some implementations provide a method for two-phase authority transition of a virtual object in a peer-to-peer shared CGR system. In the first phase, the first owner transmits a handoff message that ownership is being handed off. In the second phase, the first owner receives an acquisition message transmitted by the second owner indicating that ownership has been acquired. Authority is switched to the second owner based on the acquisition message. The method may be performed at a first electronic device associated with a first owner having authority to transmit state updates of a virtual object. The method may involve transmitting a state update to one or more peers participating in the CGR environment. The state update is associated with the current state of a virtual object in the CGR environment. Thus, during its ownership of the virtual object, the first owner transmits one or more such state updates while it has authority over the virtual object. Such updates may be received by peers and used to update an entity state graph maintained by each of those peers. The first owner may perform simulated physics to determine an update position/movement/etc. of the virtual object and transmit the new status of the virtual object at each point in time.

The method further involves the first owner transmitting a handoff message indicating that ownership of the virtual object is being handed off. In some implementations, this handoff message is the first phase of the handoff process. The handoff message may be in a state update of the virtual object and may identify the peer that will be the second owner of the virtual object following the handoff. The handoff message may be transmitted in response to the first owner receiving a handoff request message from the second owner or based on another triggering event.

The method further involves receiving an acquisition message transmitted by a second electronic device associated with the second owner. In some implementations, this acquisition message is the second phase of the handoff process. The acquisition message may explicitly or implicitly indicate that ownership of the virtual object has been acquired by the second owner. In some implementations, the acquisition message is a part of a state update message sent by the second owner.

The method further involves the original owner accepting state updates of the virtual object transmitted from the second owner based on receiving the acquisition message. Other peers may similarly accept updates of the virtual object from the second owner upon receiving the acquisition message.

In some implementations, state updates transmitted for a virtual object in the CGR environment include an ownership sequence identifier that is used to facilitate the transfer of ownership of the virtual object from one peer to another peer. When a new peer obtains ownership of a virtual object, it begins using a new ownership sequence identifier, e.g., in the state updates that it transmits, to indicate to the other peers that it is the new owner and the state updates should therefore be accepted.

In some implementations, a method for updating an ownership sequence identifier to indicate ownership transfer is performed by a computing device. In this example, the method is performed by a peer that will be the second owner of the virtual object. During a period in which the first owner of the virtual object has ownership of the virtual object, the second owner updates state information of a virtual object based on a first set of state updates received from the first owner. Such updates may include an ownership sequence identifier (e.g., n). Once ownership is obtained by the second owner, the second owner updates the ownership sequence identifier (e.g., selecting n+1). The second owner then determines and transmits a second set of state updates of the virtual object. The second set of state updates include the updated ownership sequence number. Peers receiving the second set of updates determine whether to update state information based on the updated ownership sequence number. For example, a peer may recognize the state updates based on recognizing that the ownership sequence identifier (e.g., n+1) included in the state updates of the second set is more recent than the ownership sequence identifier (e.g., n) that was included in prior state updates provided by the first owner.

In accordance with some implementations, a non-transitory computer readable storage medium has stored therein instructions that are computer-executable to perform or cause performance of any of the methods described herein. In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
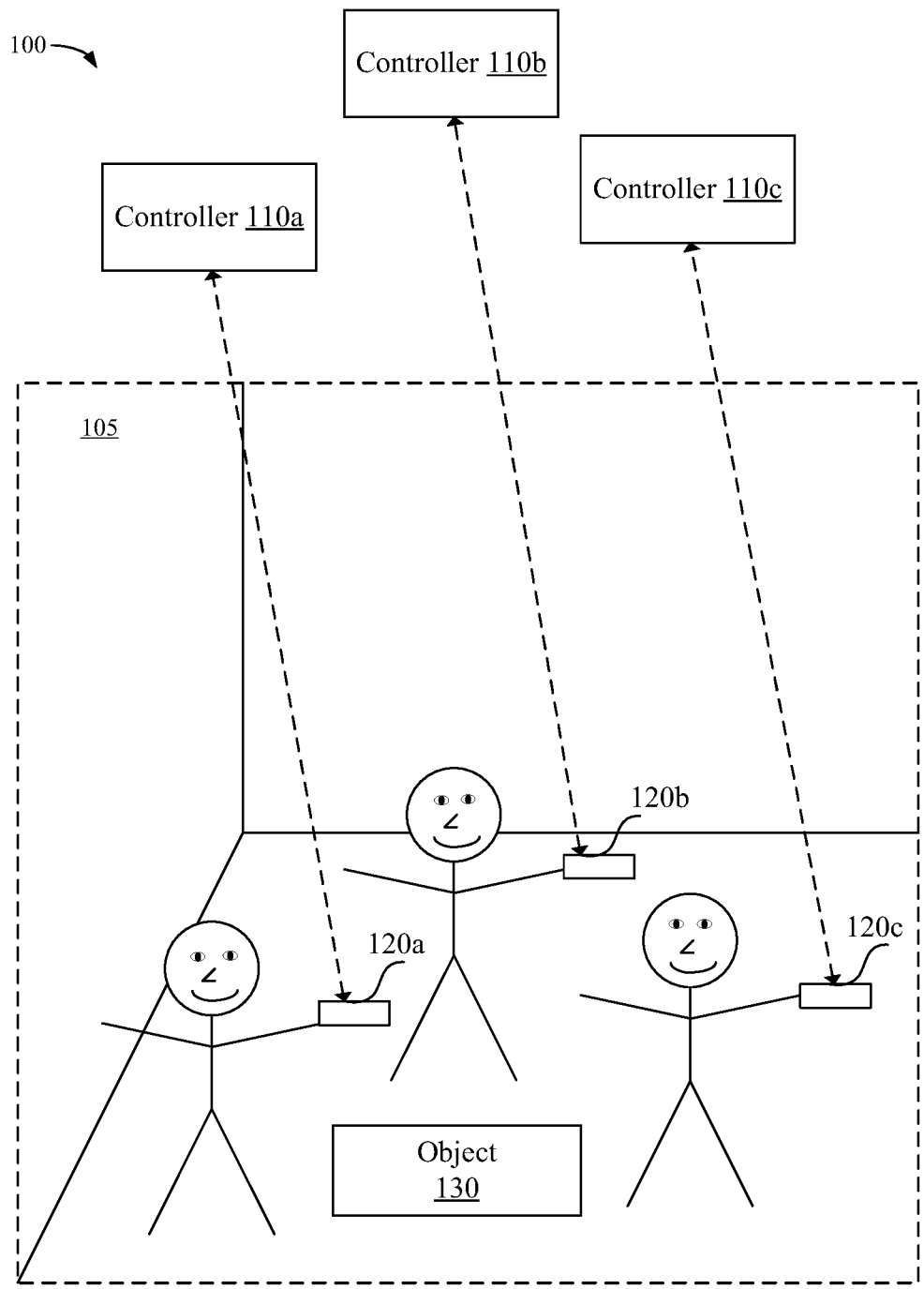
FIG. 1 is a block diagram of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Figure 2:
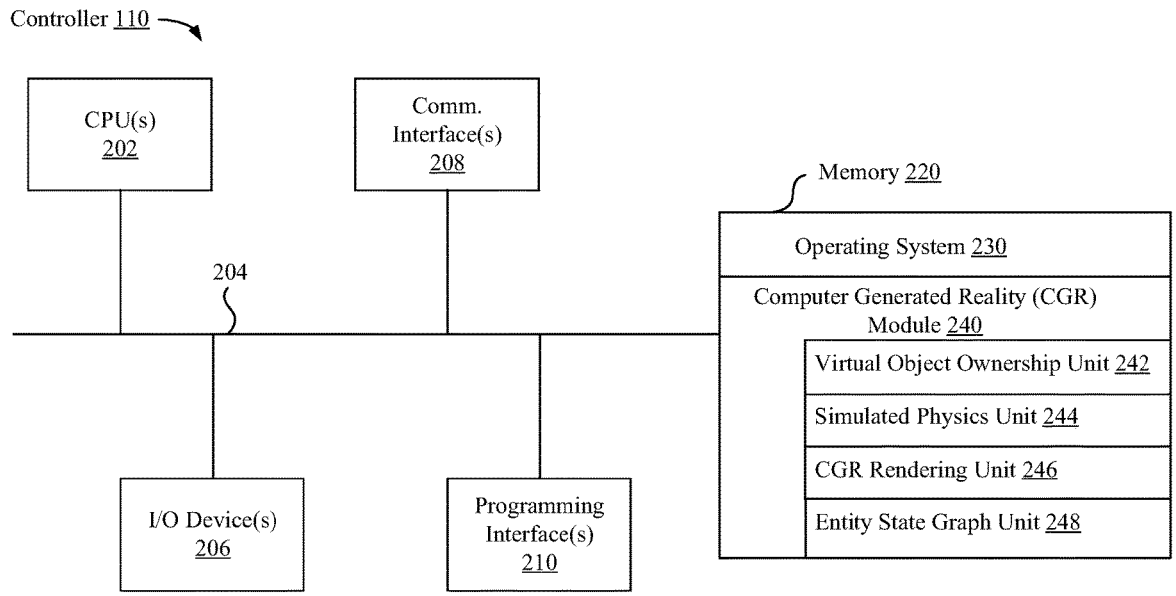
FIG. 2 is a block diagram of an example controller in accordance with some implementations.
Figure 3:
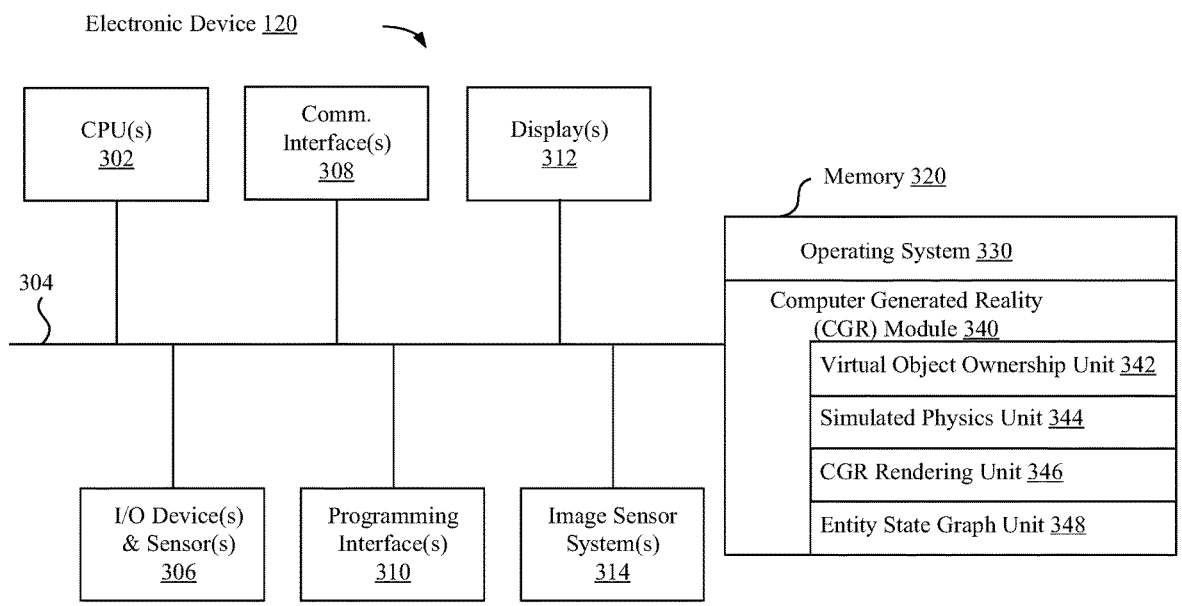
FIG. 3 is a block diagram of an example electronic device (e.g., head mounted display (HMD)) in accordance with some implementations.

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein. While FIGS. 1-3 depict exemplary implementations involving electronic devices (e.g., HMDs), other implementations do not necessarily involve an HMD and may involve other types of devices including, but not limited to, watches and other wearable electronic devices, mobile devices, laptops, desktops, gaming devices, home automation devices, and other devices that include or use image capture devices.

FIG. 1 is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 110a, a controller 110b, a controller 110c, and an electronic device (e.g., HMD) 120a, an electronic device 120b, and an electronic device 120c, one or all of which may be in a physical environment 105. A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In some implementations, each of the controllers 110a, 110b, 110c is configured to manage and coordinate a computer-generated reality (CGR) environment for the user. In some implementations, each of the controllers 110a, 110b, 110c includes a suitable combination of software, firmware, or hardware. Each of the controllers 110a, 110b, 110c is described in greater detail below with respect to FIG. 2. In some implementations, the controllers 110a, 110b, 110c are computing devices that are local or remote relative to the physical environment 105.

In one example, each of the controllers 110a, 110b, 110c is a local server located within the physical environment 105. In another example, each of the controllers 110a, 110b, 110c is a remote server located outside of the physical environment 105 (e.g., a cloud server, central server, etc.). In some implementations, each of the controllers 110a, 110b, 110c is communicatively coupled with a corresponding electronic device (e.g., HMD) 120a, electronic device 120b, and electronic device 120c via one or more wired or wireless communication channels 144 (e.g., BLUETOOTH, IEEE 802.11x, IEEE 802.16x, IEEE 802.3x, etc.).

In some implementations, a controller (e.g., 110b) and a corresponding electronic device (e.g., 120b) are configured to present the CGR environment to the user together.

In some implementations, each of the electronic devices 120a, 120b, 120c is configured to present the CGR environment to the user. In some implementations, each of the electronic devices 120a, 120b, 120c includes a suitable combination of software, firmware, or hardware. Each of the electronic devices 120a, 120b, 120c is described in greater detail below with respect to FIG. 3. In some implementations, the functionalities of the corresponding controller 110a, 110b, 110c are provided by or combined with the electronic devices 120a, 120b,120c, for example, in the case of an electronic device that functions as a stand-alone unit.

According to some implementations, each of the electronic devices 120a, 120b, 120c presents a CGR environment to the user while the user is present within the physical environment 105. A CGR environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality. A virtual reality (VR) environment refers to a simulated environment that is designed to be based entirely on computer-generated sensory inputs for one or more senses. A VR environment comprises virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality. An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

FIG. 2 is a block diagram of an example of the controllers 110a, 110b, 110c in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations each of the controllers 110a, 110b, 110c includes one or more processing units 202 (e.g., microprocessors, application-specific integrated-circuits (ASICs), field-programmable gate arrays (FPGAs), graphics processing units (GPUs), central processing units (CPUs), processing cores, or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image capture devices or other sensors, one or more displays, or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230 and computer-generated reality (CGR) module 240.

The operating system 230 includes procedures for handling various basic system services and for performing hardware dependent tasks.

In some implementations, the CGR module 240 is configured to create, edit, present, or experience CGR environments. In some implementations, the CGR module 240 includes a virtual object ownership unit 242, a simulated physics unit 244, a CGR rendering unit 246, and an entity state graph unit 248. The virtual object ownership unit 242 is configured to determine or transfer ownership of virtual content in a shared CGR environment (e.g., using a two phase process) among multiple networked peers. The simulated physics unit 244 is configured to update a state of the subset of virtual content (e.g., 3D content) controlled locally that will be used as part of shared CGR environments for one or more users. The CGR rendering unit 246 is configured to present virtual content that will be used as part of CGR environments for one or more users. For example, the user may view and otherwise experience a CGR-based user interface that allows the user to select, place, move, and otherwise present a CGR environment, for example, based on the virtual content location via hand gestures, voice commands, input device inputs, etc. The entity state graph unit 248 is configured to locally maintain a representation of a shared CGR environment for multiple networked peers using a local entity state graph. Although these modules and units are shown as residing on a single device (e.g., the electronic device 120), it should be understood that in other implementations, any combination of these modules and units may be located in separate computing devices.

Although these modules and units are shown as residing on a single device (e.g., the controller 110a), it should be understood that in other implementations, any combination of these modules and units may be located in separate computing devices. Moreover, FIG. 2 is intended more as functional description of the various features which are present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, or firmware chosen for a particular implementation.

FIG. 3 is a block diagram of an example of each of the electronic devices 120a, 120b, 120c in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations each of the electronic devices 120a, 120b, 120c includes one or more processing units 302 (e.g., microprocessors, ASICs, FPGAs, GPUs, CPUs, processing cores, or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, or the like type interface), one or more programming (e.g., I/O) interfaces 310, one or more displays 312, one or more interior or exterior facing image sensor systems 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), or the like.

In some implementations, the one or more displays 312 are configured to present a CGR environment to the user. In some implementations, the one or more displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), or the like display types. In some implementations, the one or more displays 312 correspond to diffractive, reflective, polarized, holographic, etc. waveguide displays. For example, each of the electronic devices 120a, 120b, 120c may include a single display. In another example, each of the electronic devices 120a, 120b, 120c may include a display for each eye of the user.

In some implementations, the one or more interior or exterior facing image sensor systems 314 include an image capture device or array that captures image data or an audio capture device or array (e.g., microphone) that captures audio data. The one or more image sensor systems 314 may include one or more RGB cameras (e.g., with a complimentary metal-oxide-semiconductor (CMOS) image sensor or a charge-coupled device (CCD) image sensor), monochrome cameras, IR cameras, event-based cameras, or the like. In various implementations, the one or more image sensor systems 314 further include an illumination source that emits light such as a flash. In some implementations, the one or more image sensor systems 314 further include an on-camera image signal processor (ISP) configured to execute a plurality of processing operations on the image data.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and a CGR module 340.

The operating system 330 includes procedures for handling various basic system services and for performing hardware dependent tasks.

In some implementations, the CGR module 340 is configured to create, edit, present, or experience CGR environments. In some implementations, the CGR module 340 includes a virtual object ownership unit 342, a simulated physics unit 344, a CGR rendering unit 346, and an entity state graph unit 348. The virtual object ownership unit 342 is configured to determine or transfer ownership of virtual content in a shared CGR environment (e.g., using a two phase process) among multiple networked peers. The simulated physics unit 344 is configured to update a state of the subset of virtual content (e.g., 3D content) controlled locally that will be used as part of shared CGR environments for one or more users. The CGR rendering unit 346 is configured to present virtual content that will be used as part of CGR environments for one or more users. For example, the user may view and otherwise experience a CGR-based user interface that allows the user to select, place, move, and otherwise present a CGR environment, for example, based on the virtual content location via hand gestures, voice commands, input device inputs, etc. The entity state graph unit 348 is configured to locally maintain a representation of a shared CGR environment for multiple networked peers using a local entity state graph. Although these modules and units are shown as residing on a single device (e.g., the electronic device 120), it should be understood that in other implementations, any combination of these modules and units may be located in separate computing devices.

Moreover, FIG. 3 is intended more as a functional description of the various features which are present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, or firmware chosen for a particular implementation.

Various implementations disclosed herein include devices, systems, and methods for providing authority transfer of a virtual object in a shared CGR environment. Various implementations disclosed herein include devices, systems, and methods for systematically resolving conflicts in state updates for virtual objects that are produced by multiple networked peers that can transfer ownership of the virtual objects in a shared CGR environment. In some implementations, ownership of a virtual object is identified as the authority to modify a state of the virtual object or transmit state updates for the virtual object in the CGR environment.

In various implementations, the shared or synchronized CGR environment provides 3D world replication between networked peers where each networked peer (e.g., node in a networked session) is capable of creating and modifying a certain subset of virtual objects in the CGR environment. In various implementations, a complete state of the virtual object is transmitted or updated. In some implementations, virtual objects are modified on every frame of a real time CGR environment (e.g., game simulation). In some implementations, once a virtual object is modified, the new state of that virtual object is transmitted to other networked peers participating in the CGR environment so the other networked peer can update their local state of the CGR environment (e.g., 3D world replication). For example, each peer can control an avatar that can move and interact (e.g., pick up a freely place virtual object) in the synchronized CGR environment and transmit state updates for their avatar. In various implementations, the shared CGR environment provides 3D world replication between networked peers using entity graph state synchronization (e.g., converging local copies of an common entity graph). In some implementations, the entity graph represents the current CGR environment.

In various implementations, a single networked peer is the owner of each virtual object in the shared CGR environment. In various implementations, ownership, of a virtual object automatically goes to the creating networked peer in the shared CGR environment. In various implementations, only the single networked peer owning the virtual object is able to hand off or transfer ownership of the virtual object to another networked peer in the shared CGR environment.

Exemplary devices, systems, and methods of authority transfer of a virtual object in a shared computer-generated reality (CGR) environment according to some implementations will now be described. In some implementations, a first networked peer that owns the virtual object (e.g., current owner) is able to transfer ownership (e.g., hand off authority over) using a two phase process. In some implementations in the first phase, the first peer owning the virtual object notifies all networked peers (e.g., all peers in the CGR environment that can "see" or are aware of the virtual object) that ownership is being transferred to a destination peer (e.g., next owner). In some implementations in a second phase, the first peer (e.g., and all other peers) receives an acquisition message transmitted by the second peer (e.g., next owner) indicating that ownership has been acquired and switches authority over to the second peer (e.g., next owner).

Figure 4:
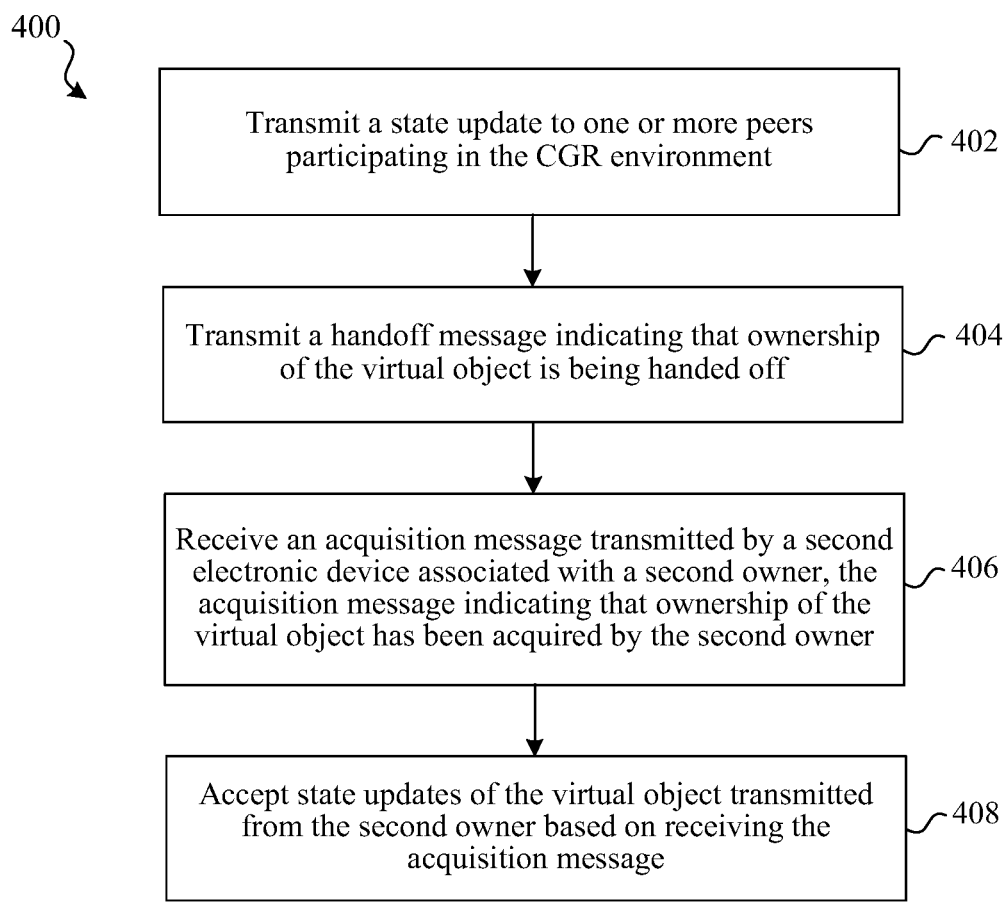
FIG. 4 is a flowchart illustrating an exemplary method of authority transfer of a virtual object in a shared CGR environment according to some implementations.

FIG. 4 is a flowchart illustrating an exemplary method of authority transfer of a virtual object in a shared CGR environment according to some implementations. In some implementations, the method 400 is performed by a device (e.g., controller 100*a* or electronic device 120*a* of FIGS. 1-3). The method 400 can be performed for CGR environments using an electronic device or by multiple devices in communication with one another. In some implementations, the method 400 is performed by processing logic, including hardware, firmware, software, or a combination thereof. In some implementations, the method 400 is performed by a processor executing code stored in a non-transitory computer-readable medium (e.g., a memory).

At block 402, the method 400 transmits a state update associated with a virtual object to one or more peers participating in a CGR environment. In various implementations, a first electronic device associated with a first peer participating in the CGR environment has the authority to transmit the state updates of the virtual object. In some implementations, the first electronic device associated with the first peer owns the virtual object. In some implementations, the first electronic device associated with the first peer is the first owner of the virtual object because the first peer created the virtual object. In some implementations, the state updates of the virtual object include a ownership sequence identifier (e.g., preset number sequence). In some implementations, when the virtual object is created, its ownership sequence identifier is 1 or "n".

In some implementations, the state updates of the virtual object include information about the virtual object such as position, orientation, movement, angular velocity, material characteristics (e.g., shape, surface, density, etc. or changes in the same), characteristics associated with the CGR environment (e.g., health, etc.), animation properties (e.g., joints, limbs and allowed motions), states of animation or the like. In some implementations, the state updates of the virtual object include a complete state of the virtual object. In some implementations, the state updates of the virtual object include changes from the immediately preceding state update of the virtual object.

At block 404, the method 400 transmits a handoff message indicating that ownership of the virtual object is being handed off to another peer of the peers participating in the CGR environment. In some implementations, the handoff message is included in a state update of the virtual object. In some implementations, the handoff message is part of a state update of the virtual object and includes a destination peer identifier of a second peer as the second owner (e.g., next owner) and the ownership sequence identifier associated with the first owner (e.g., 1 or "n"). In some implementations, a handoff message from the first peer that is authorized to transmit state updates of the virtual object is triggered by a handoff request message from a requesting peer (e.g., next owner) of the peers participating in the CGR environment. In some implementations, the handoff message from the first peer current owner of the virtual object is triggered by characteristics of the participating peers (e.g., current owner), their associated electronic devices, or the CGR environment.

At block 406, the method 400 receives an acquisition message transmitted by a second electronic device associated with the second peer of the peers participating in the CGR environment indicating that authority to transmit state updates of the virtual object has been acquired by the second peer. In some implementations, the transmitted acquisition message indicates that ownership of the virtual object has been acquired by the second peer. In some implementations, the acquisition message is included in a state update of the virtual object. In some implementations, the acquisition message is part of the state update of the virtual object and includes an identifier of the second peer or the sequentially-incremented ownership sequence identifier (e.g., number) associated with the second peer (e.g., 2 or "n+1").

At block 408, the method 400 accepts state updates of the virtual object transmitted from the second peer based on receiving the acquisition message. In some implementations, the first peer accepts state updates of the virtual object transmitted from the second peer based on the relatively higher sequential value (e.g., incremented) of the ownership sequence identifier included in the state update. In some implementations, all of the peers participating in the CGR environment accept state updates of the virtual object upon receiving the acquisition message. In some implementations, all of the peers participating in the CGR environment accept state updates of the virtual object based on the relatively later sequential value (e.g., incremented) of the ownership sequence identifier included in the state update.

FIGS. 5-9 are block diagrams illustrating a CGR environment at different sequential times during which a plurality of devices participate in a shared CGR environment according to some implementations.

Figure 5:
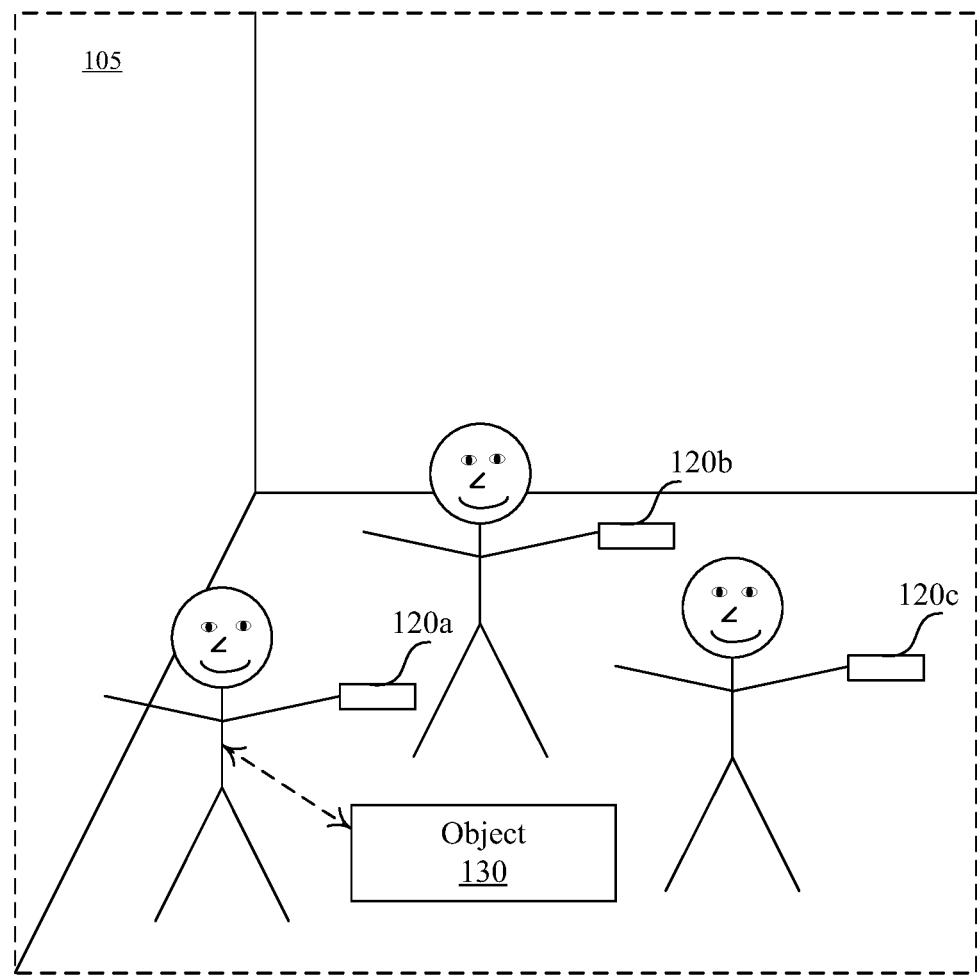
FIGS. 5-9 are block diagrams illustrating a physical environment at different sequential times during which a plurality of devices participate in a shared CGR environment according to some implementations.

FIG. 5 is a diagram that shows a plurality of networked peers using electronic devices 120*a*, 120*b*, 120*c* to respectively participate in a shared CGR environment. As shown in FIG. 5, a first peer creates and owns a virtual object 130 using the electronic device 120*a* in the CGR environment. In some implementations, the networked peer creator is automatically assigned the owner (e.g., authority to transmit state updates) of the virtual object 130. In some implementations, other ownership rules can be used. For example, a ownership rule can be based on a relative number of virtual object currently owned (e.g., computational load balancing). For another example, a ownership rule can be based on a relative physical position in the CGR environment so a centrally-located peer owns more virtual objects than a remote or tangentially located peer (e.g., communication link quality or QoS balancing).

Figure 6:
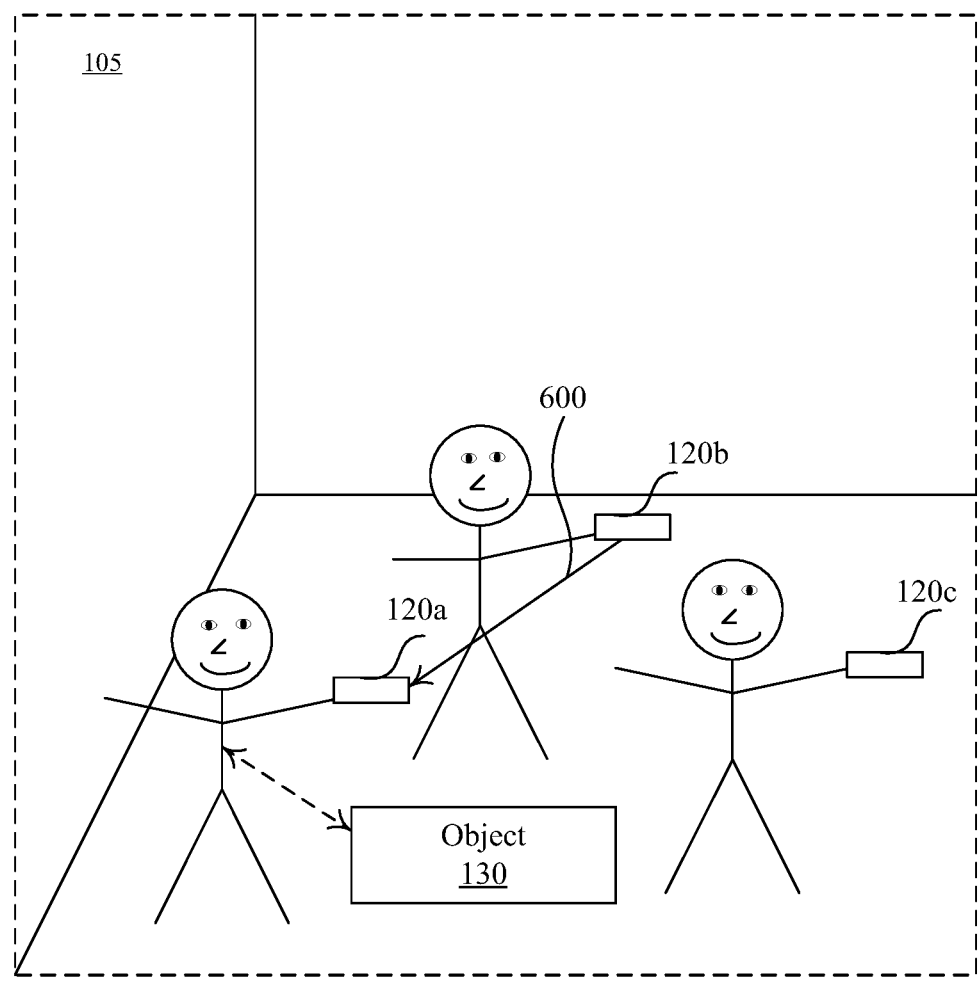

FIG. 6 is a diagram that shows the plurality of networked peers using the electronic devices 120*a*, 120*b*, 120*c* to respectively participate in the shared CGR environment at a later time than FIG. 5. As shown in FIG. 6, the first networked peer receives a handoff request message 600 at the electronic device 120*a* from a second networked peer using the electronic device 120*b*. In some implementations, other triggers are used to initiate the handoff of the virtual object 130 from the first networked peer.

Figure 7:
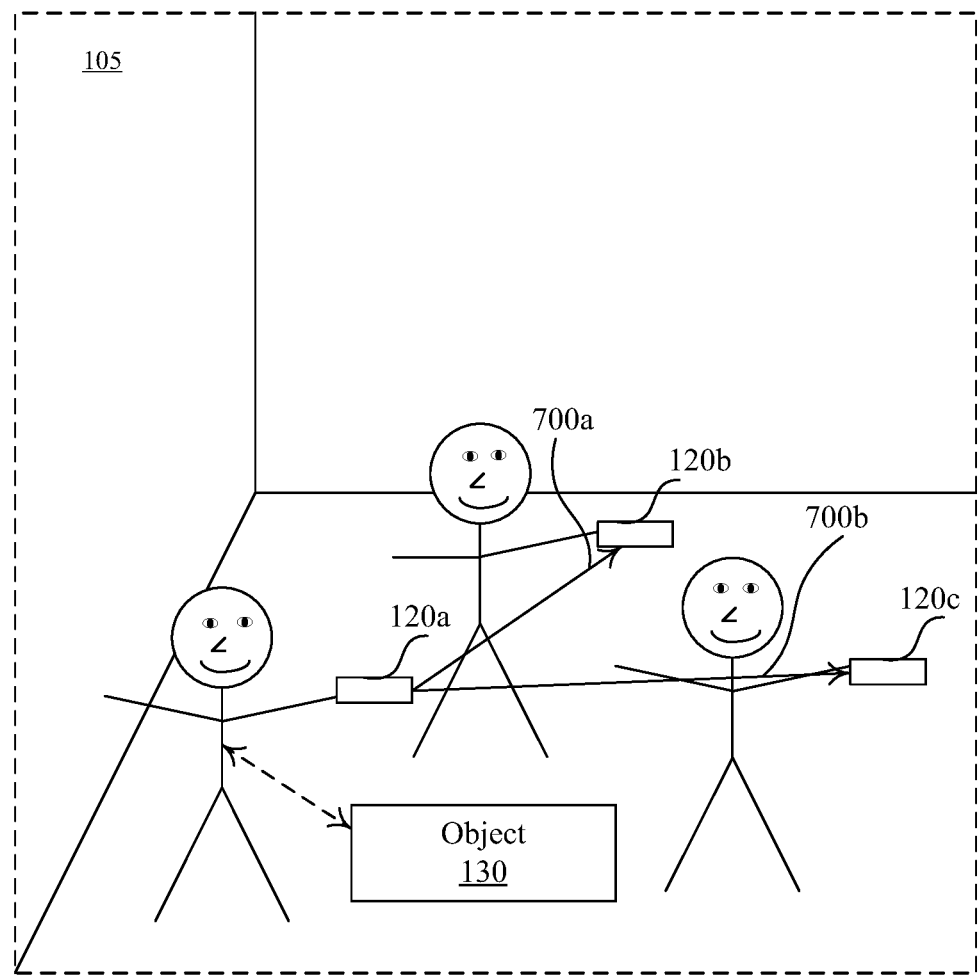

FIG. 7 is a diagram that shows the plurality of networked peers using the electronic devices 120*a*, 120*b*, 120*c* to respectively participate in the shared CGR environment at a later time than FIG. 6. As shown in FIG. 7, the first networked peer transmits a handoff message 700*a*, 700*b* using the electronic device 120*a* to other networked peers in the CGR environment (e.g., a first phase). In some implementations, the current owner of the virtual object 130 transmits a state update with a "handoff" attachment to all networked peers that know about the virtual object 130. In some implementations, the handoff attachment includes a destination peer identifier and an ownership sequence number, and peers that receive the handoff attachment (except the new owner) put the virtual object 130 into a handoff transition state. At this point (e.g., during ownership transition), the original owner is still considered the owner and is able to send state updates for the virtual object 130, which other networked peers will continue to accept and use to locally update the shared CGR environment.

Figure 8:
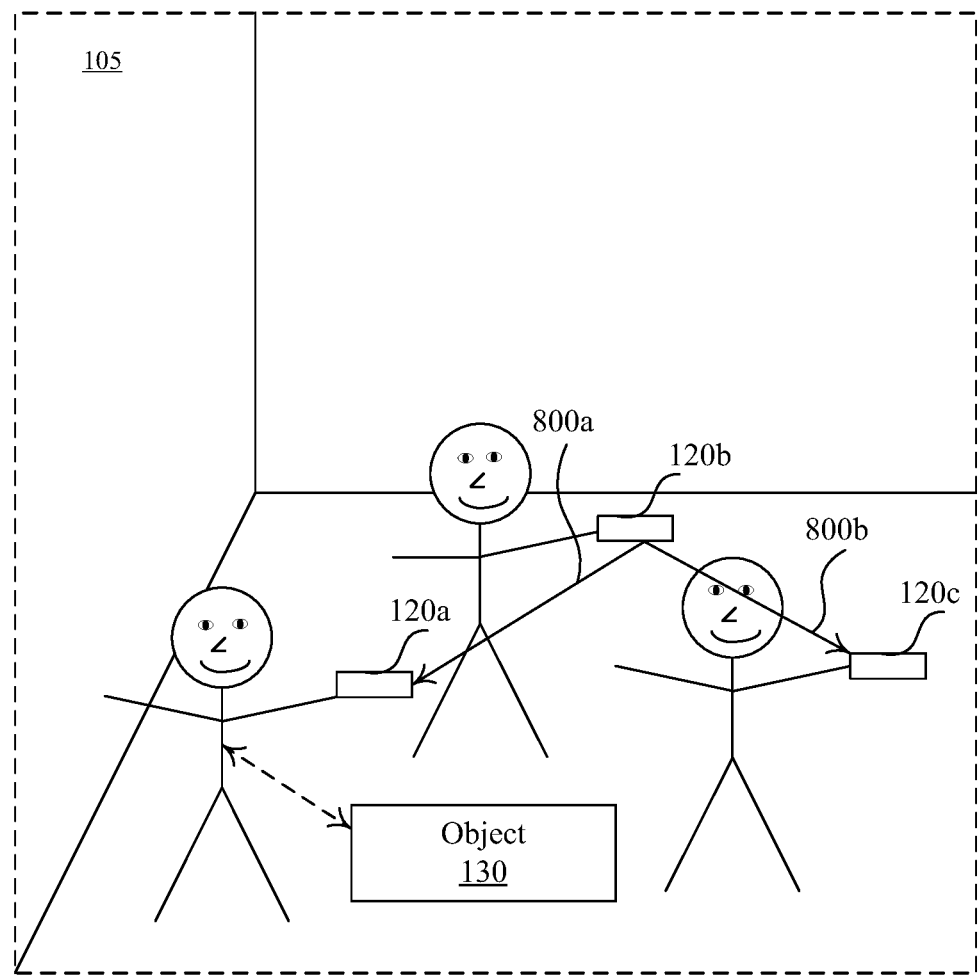

FIG. 8 is a diagram that shows the plurality of networked peers using the electronic devices 120*a*, 120*b*, 120*c* to respectively participate in the shared CGR environment at a later time than FIG. 7. As shown in FIG. 8, when the new owner destination peer receives the handoff state update (e.g., handoff attachment) from the current owner (e.g., original owner) the destination peer sets itself as the owner (e.g., second phase) for the virtual object 130 and updates the virtual object 130 ownership sequence number (e.g., increments, decrements, etc.). Then, the new owner networked peer transmits a state update 800*a*, 800*b* of the virtual object 130 using the electronic device 120*b* to indicate ownership is acquired to all other networked peers.

Figure 9:
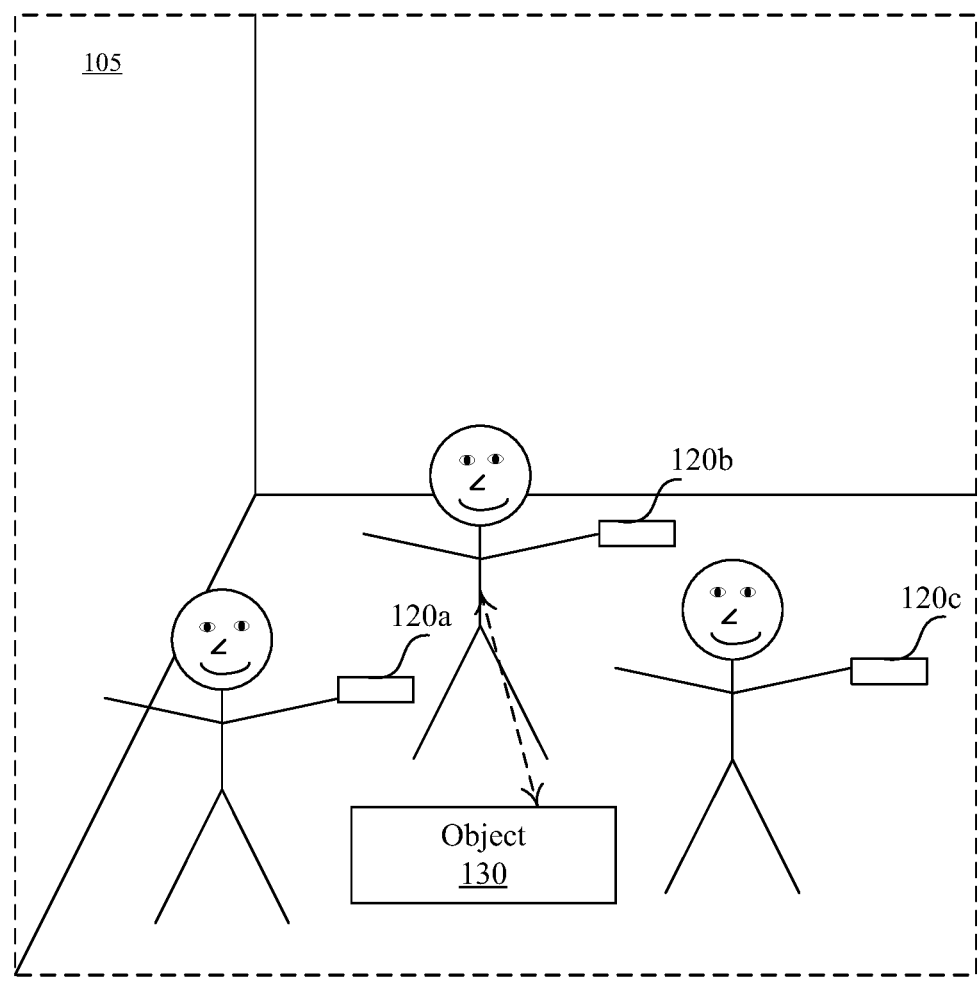

FIG. 9 is a diagram that shows the plurality of networked peers using the electronic devices 120*a*, 120*b*, 120*c* to respectively participate in the shared CGR environment at a later time than FIG. 8. As shown in FIG. 9, when the other networked peers receive the state update 800*a*, 800*b* for the virtual object 130 (with the updated ownership sequence number, e.g., n+1), the other networked peers switch ownership (e.g., authority) for the virtual object 130 to the second peer using the electronic devices 120*a*, 120*c*. In some implementations, the state update 800*a*, 800*b* includes a complete state update for the virtual object 130.

As shown in FIG. 5-9, in some implementations the ownership sequence number is sent with every state update for each virtual object in the CGR environment that supports ownership transfer. In some implementations, the ownership sequence number is incremented every time a handoff occurs, and the increment to the ownership sequence number is applied by the new owner. When one networked peer receives a state update for a virtual object including an ownership sequence number for that virtual object that is higher than already locally held, that networked peer assumes that one or more ownership transfers have occurred that it is unaware of because of lost or re-ordered network (e.g., handoff messages) and switches ownership to the network peer associated with the state update with the highest ownership sequence number.

In some implementations, state updates transmitted for a virtual object in the CGR environment include an ownership sequence identifier that is used to facilitate the transfer of ownership of the virtual object from one peer to another peer. When a new peer obtains ownership of a virtual object, it begins using a new ownership sequence identifier, e.g., in the state updates that it transmits, to indicate to the other peers that it is the new owner and the state updates should therefore be accepted.

In some implementations, during ownership transfer from the first peer (current owner) to the second peer (next owner), either or both of the first peer and the second peer may disconnect from the shared CGR environment. For example, the disconnect may be caused by power loss, communications loss, avatar elimination in the CGR environment, a networked peer decision to leave, or the like. In some implementations, when either of the two networked peers involved in ownership transfer disconnects before transfer completion, the virtual object is considered to be orphaned. In some implementations, preset orphan procedures are activated for all peers in the CGR environment that were aware of the ownership transition where either of the involved two networked peers are disconnected.

In some implementations of shared CGR environment the preset orphan procedures are selected to deterministically converge the networked peers in the CGR environment to a synchronized CGR environment. In one implementation, the preset orphan procedure operates to drop or destroy the orphaned virtual object. In another implementation, the preset orphan procedure operates to maintain the orphaned virtual object by automatically assigning the orphaned virtual object to a remaining networked peer (e.g., peer with the fewest virtual objects, peer on the same team, peer with the highest power or battery level, immediately preceding owner, or the like).

Figure 10:
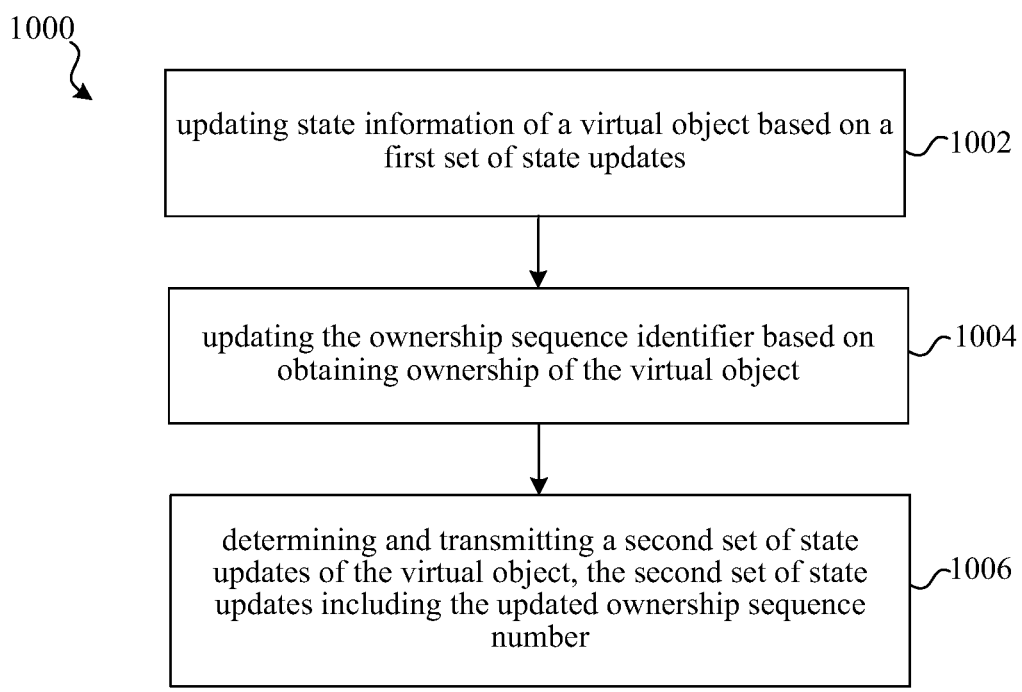
FIG. 10 is a flowchart illustrating an exemplary method of using ownership sequence identifier to indicate ownership transfer according to some implementations.

FIG. 10 is a flowchart illustrating an exemplary method of using ownership sequence identifier to indicate ownership transfer. In some implementations, the method 1000 is performed by a device (e.g., controller 100*a* or electronic device (e.g., HMD) 120*a* of FIGS. 1-3). The method 1000 can be performed for CGR environments using an electronic device or by multiple devices in communication with one another. In some implementations, the method 1000 is performed by processing logic, including hardware, firmware, software, or a combination thereof. In some implementations, the method 1000 is performed by a processor executing code stored in a non-transitory computer-readable medium (e.g., a memory).

In this example, the method 1000 is performed by a peer that will be the second owner of the virtual object. During a period in which the first owner of the virtual object has ownership of the virtual object, the second owner updates state information of a virtual object based on a first set of state updates received from the first owner. Such updates may include an ownership sequence identifier (e.g., n). Thus, at block 1002 of method 1000, the second owner updates state information of a virtual object (e.g., a local CGR environment representation) based on a first set of state updates received from a peer participating in the CGR environment. In various implementations, a single peer (e.g., using an electronic device) participating in a peer-to-peer CGR environment has the authority to transmit the state updates (e.g., first set of state updates) of the virtual object. The updating may be based on ownership sequence identifiers in first set of state updates, e.g., the second owner hasn't obtained ownership yet and is receiving state updates from the first owner that include a first ownership sequence identifier that the second owner recognizes as current. In some implementations, at block 1002, the method updates the state information of a virtual object using the first set of state updates because the first set of updates include the currently highest prioritized ownership sequence identifier. In some implementations, the received state information of the virtual object in the first set of state updates are used to update a local copy of the CGR environment represented in an entity state graph.

Once ownership is obtained by the second owner, the second owner updates the ownership sequence identifier (e.g., selecting n+1). Thus, at block 1004 of method 1000, the second device updates the ownership sequence identifier based on obtaining ownership of the virtual object. In some implementations, the ownership sequence identifier is a number that is incremented by 1 by the second owner. In some implementations, the ownership sequence identifiers have a preset order that has a sequentially progressing priority known by all peers participating in the CGR environment. In some implementations ownership of the virtual object is obtained using a handoff message/status and an acquisition message/status.

After updating the ownership sequence identifier, at block 1006 of method 1000, the second device determines and transmits a second set of state updates of the virtual object. The second set of state updates includes the updated ownership sequence identifier. In some implementations, the first set of state updates and the second set of state updates include information about the virtual object such as position, orientation, movement, angular velocity, material characteristics (e.g., shape, surface, density, etc. or changes in the same), characteristics associated with the CGR environment (e.g., health, etc.), animation properties (e.g., joints, limbs and allowed motions), states of animation. In some implementations, the state updates of the virtual object include a complete state of the virtual object. In some implementations, the state updates of the virtual object include changes from the immediately preceding state update of the virtual object.

Peers receiving the second set of updates determine whether to update state information based on the updated ownership sequence number. For example, a peer may recognize the state updates based on recognizing that the ownership sequence identifier (e.g., n+1) included in the state updates of the second set is more recent than the ownership sequence identifier (e.g., n) that was included in prior state updates provided by the first owner.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

In some implementations, a system includes a non-transitory computer-readable storage medium; and one or more processors coupled to the non-transitory computer-readable storage medium, wherein the non-transitory computer-readable storage medium includes program instructions that, when executed on the one or more processors, cause the system to perform exemplary methods disclosed herein. In some implementations, a non-transitory computer-readable storage medium, stores program instructions computer-executable on a computer to perform operations including exemplary methods disclosed herein.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various objects, these objects should not be limited by these terms. These terms are only used to distinguish one object from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "or" as used herein refers to and encompasses any and all possible combinations of one or more of the associated listed items. It will be further understood that the terms "comprises" or "comprising," when used in this specification, specify the presence of stated features, integers, steps, operations, objects, or components, but do not preclude the presence or addition of one or more other features, integers, steps, operations, objects, components, or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations, but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method of authority transfer of a virtual object in a shared computer-generated reality (CGR) environment, the method comprising:
    at a first electronic device associated with a first owner having authority to transmit state updates of a virtual object, the first electronic device having a processor:
        transmitting a state update to one or more peers participating in the shared CGR environment, the state update associated with a current state of a virtual object in the shared CGR environment;
        transmitting a handoff message indicating that ownership of the virtual object is being handed off;
        receiving an acquisition message transmitted by a second electronic device associated with a second owner, the acquisition message indicating that ownership of the virtual object has been acquired by the second owner;
        transmitting to the one or more peers, by the first owner, at least one state update of the virtual object during an ownership transition period between the transmitting of the handoff message and the receiving of the acquisition message, wherein the transmitting of the at least one state update, when received by the one or more peers, causes the one or more peers to locally update a display of the virtual object within the shared CGR environment; and
        accepting state updates of the virtual object transmitted from the second owner based on the receiving the acquisition message.

2. The method of claim 1, where the first owner transmits one or more state updates while the first owner has authority over the virtual object.

3. The method of claim 2, where the first owner repeatedly transmits a new status to update the virtual object over time in the state updates.

4. The method of claim 1, where the first owner performs simulated physics to determine an updated pose or movement of the virtual object to transmit a new status at each point in time in a first set of updates that each include an ownership sequence number.

5. The method of claim 4, where the first set of state updates transmitted by the first user are used to update an entity state graph maintained by each of the one or more peers participating in the shared CGR environment.

6. The method of claim 1, where the handoff message is in a state update that identifies a destination peer of the second owner and an ownership sequence number associated with the first owner.

7. The method of claim 6, where the handoff message is transmitted by the first owner in response to receiving a handoff request message from the second owner.

8. The method of claim 1, where the acquisition message is in a state update for the virtual object sent by the second owner.

9. The method of claim 1, where the state update includes an ownership sequence number and where the acquisition message is in a second state update that identifies the second owner and an updated ownership sequence number that the second owner uses when updating the virtual object.

10. The method of claim 9, further comprising receiving a second set of state updates of the virtual object transmitted by the second electronic device, the second set of state updates including the updated ownership sequence number, wherein peers receiving the second set of state updates determine whether to update state information based on the updated ownership sequence number.

11. The method of claim 1, where an ownership sequence number in the state updates are used by said each of the one or more peers participating in the CGR environment to determine the authority of the virtual object.

12. A method for providing a shared computer-generated reality (CGR) environment, the method comprising:
    at an electronic device having a processor:
        receiving, from a first peer, a first set of state updates of a virtual object during an ownership transition period between transmitting a handoff message indicating that ownership of the virtual object is being handed off from the first peer and receiving an acquisition message indicating that ownership of the virtual object has been acquired by a second peer, wherein said receiving the first set of state updates causes the second peer to locally update a display of the virtual object within the shared CGR environment;
        updating state information of the virtual object based on the first set of state updates received from the first peer participating in the CGR environment, the updating based on ownership sequence identifiers in the first set of state updates received from the first peer;

updating the ownership sequence identifiers based on completion of the ownership transition period; and determining and transmitting a second set of state updates of the virtual object, the second set of state updates including the updated ownership sequence identifiers, wherein the transmitting the second set of state updates causes receiving peers to update state information based on the updated ownership sequence identifiers.

13. The method of claim 12, where updating the ownership sequence identifiers comprises sequentially augmenting an ownership sequence number by at least one value.

14. The method of claim 13, where sequentially augmenting the ownership sequence number by at least one value comprises incrementing the ownership sequence number by 1 or decrementing the ownership sequence number by 1.

15. The method of claim 12, where the first set of state updates and the second set of state updates each include a new status to update the virtual object over time.

16. The method of claim 12, where simulated physics determines an updated pose or movement of the virtual object at each point in time.

17. The method of claim 12, where the first set of state updates or the second set of state updates are used to update an entity state graph maintained by each of the one or more peers participating in the shared CGR environment.

18. The method of claim 12, where the ownership sequence identifiers comprise a prescribed sequentially progressing priority.

19. A system comprising:
a non-transitory computer-readable storage medium; and
one or more processors coupled to the non-transitory computer-readable storage medium, wherein the non-transitory computer-readable storage medium comprises program instructions that, when executed on the one or more processors, cause the system to perform operations comprising:
receiving, from a first peer, a first set of state updates of a virtual object during an ownership transition period between transmitting a handoff message indicating that ownership of the virtual object is being handed off from the first peer and receiving an acquisition message indicating that ownership of the virtual object has been acquired by a second peer, wherein said receiving the first set of state updates causes the second peer to locally update a display of the virtual object within the shared CGR environment;
updating state information of the virtual object based on the first set of state updates received from the first peer participating in the CGR environment, the updating based on ownership sequence identifiers in the first set of state updates received from the first peer;
updating the ownership sequence identifiers based on completion of the ownership transition period; and
determining and transmitting a second set of state updates of the virtual object, the second set of state updates including the updated ownership sequence identifiers, wherein the transmitting the second set of state updates causes receiving peers to update state information based on the updated ownership sequence identifiers.

* * * * *